United States Patent
Matsumoto et al.

(10) Patent No.: US 9,520,754 B2
(45) Date of Patent: Dec. 13, 2016

(54) MOTOR AND DISK DRIVE APPARATUS

(71) Applicant: Nidec Corporation, Kyoto (JP)

(72) Inventors: Takuro Matsumoto, Kyoto (JP); Atsushi Yawata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 16 days.

(21) Appl. No.: 14/220,506

(22) Filed: Mar. 20, 2014

(65) Prior Publication Data

US 2014/0203691 A1 Jul. 24, 2014

Related U.S. Application Data

(63) Continuation-in-part of application No. 13/785,194, filed on Mar. 5, 2013, now abandoned.

(60) Provisional application No. 61/706,996, filed on Sep. 28, 2012.

(51) Int. Cl.

| H02K 11/00 | (2016.01) |
| H02K 7/08 | (2006.01) |
| F16C 32/06 | (2006.01) |
| F16C 32/00 | (2006.01) |
| H02K 5/16 | (2006.01) |
| H02K 1/18 | (2006.01) |
| H02K 3/52 | (2006.01) |
| G11B 19/20 | (2006.01) |

(52) U.S. Cl.
CPC ............. *H02K 5/16* (2013.01); *G11B 19/2009* (2013.01); *H02K 1/187* (2013.01); *H02K 3/522* (2013.01)

(58) Field of Classification Search
CPC ................................ H02K 21/22; G11B 19/20
USPC ... 310/67 R, 90.425; 384/100, 107, 112–113
See application file for complete search history.

(56) References Cited

U.S. PATENT DOCUMENTS

| 6,375,357 | B2 * | 4/2002 | Miura | F16C 17/045 384/100 |
| 8,451,558 | B2 | 5/2013 | Watanabe et al. | |
| 2006/0130089 | A1 * | 6/2006 | Toyokawa et al. | 720/697 |
| 2010/0329104 | A1 * | 12/2010 | Yawata et al. | 369/264 |
| 2012/0050911 | A1 * | 3/2012 | Tamaoka | H02K 21/22 360/99.08 |

OTHER PUBLICATIONS

Matsumoto et al., "Base Unit, Motor and Disk Drive Apparatus", U.S. Appl. No. 13/785,194, filed Mar. 5, 2013.

* cited by examiner

*Primary Examiner* — Jose Gonzalez Quinones
(74) *Attorney, Agent, or Firm* — Keating & Bennett, LLP

(57) ABSTRACT

A motor for use in a disk drive apparatus includes a bearing, a rotary unit, a stator, a thin flat base member, and a cylindrical holder extending in an axial direction. The base member includes a first through-hole, a peripheral edge portion, and a thin portion. The thin portion is located radially outward of the peripheral edge portion. The thin portion has an axial thickness smaller than an axial thickness of the peripheral edge portion. The holder includes a first protrusion portion and a second protrusion portion. The first protrusion portion extends radially outward and is located axially above the peripheral edge portion. The second protrusion portion extends radially outward and is located axially below the peripheral edge portion. The bearing is located inside the holder. A stator core is located radially outside the holder and axially above the thin portion.

12 Claims, 14 Drawing Sheets

MOTOR AND DISK DRIVE APPARATUS

BACKGROUND OF THE INVENTION

1. Field of the Invention

The present invention relates to a motor and a disk drive apparatus.

2. Description of the Related Art

Conventionally, a disk drive apparatus such as a hard disk drive apparatus or the like is equipped with a spindle motor for rotating a disk. The disk drive apparatus includes a disk, a housing, a stator, a FPC (Flexible Printed Circuit), and so forth. The housing includes a cover member, a base member, and so forth.

In recent years, the disk drive apparatus is required to become smaller in height and size. Particularly, for the sake of further reducing the height of a 2.5 inch-type 7 mm-thick disk drive apparatus which belongs to small-size disk drive apparatuses, it is necessary to reduce the thickness of a motor arranged within the housing. In general, the motor includes a hub, a coil, a stator core, a wiring substrate, a base member, etc. When assembling the motor, these components are arranged to axially overlap with one another. In order for the motor to become thin, these components need to be made thinner. However, if an attempt is made to reduce the overall height of the motor by reducing the turn number of the coils or the lamination thickness of the stator core, the magnetic fluxes generated from the stator during the operation of the motor gets reduced. In other words, a torque constant is reduced. This makes it impossible to obtain the torque required in rotating the disk attached to the hub.

In order to reduce the height of the motor, it is therefore necessary to reduce the thickness of the base member, among the components of the motor, which occupies a large proportion in the axial dimension of the motor. However, if the base member is merely made thin, the rigidity of the base member is reduced to a great extent. As a result, the base member is apt to undergo deformation when a bushing is arranged on the base member.

Accordingly, a demand has existed for a structure capable of fixing a bushing to a base member while reducing the overall height of a motor.

SUMMARY OF THE INVENTION

An illustrative motor of a preferred embodiment of the present invention is preferably used in a disk drive apparatus. The motor includes a bearing, a rotary unit connected to the bearing, a stator, a base member, and a holder. The base member includes a first through-hole extending in an axial direction, a peripheral edge portion extending radially outward from the first through-hole, and a thin portion arranged radially outward of the peripheral edge portion. The holder is provided in the first through-hole. The holder includes a first protrusion portion and a second protrusion portion. The first protrusion portion extends radially outward and is located above the peripheral edge portion. The second protrusion portion extends radially outward and is located below the peripheral edge portion. The bearing is arranged inside the holder. A stator core is located outside the holder and above the thin portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
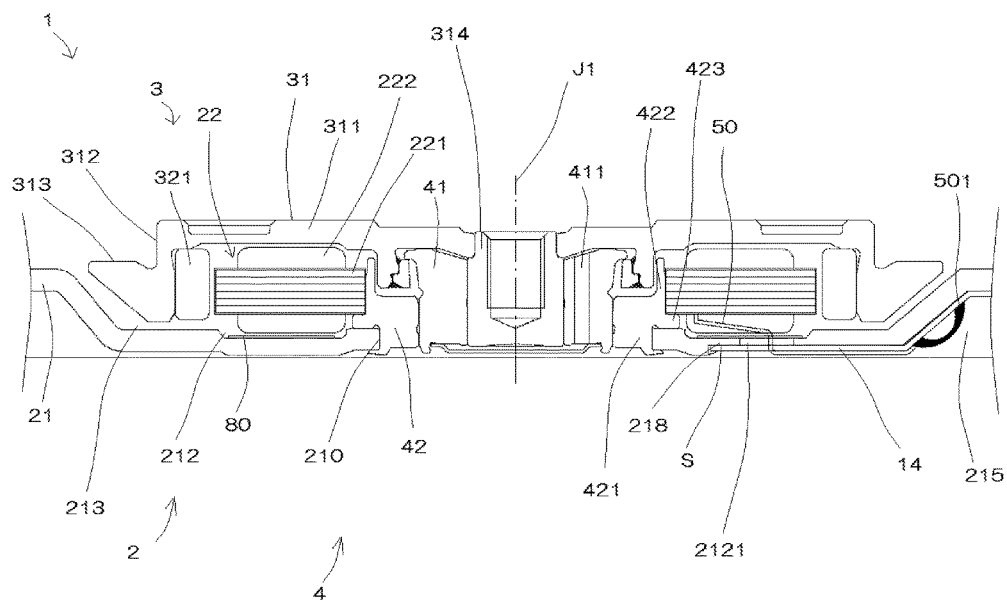
FIG. 1 is a section view showing a motor according to a preferred embodiment of the present invention.

In the subject specification, the upper side in FIG. 1 along a center axis direction of a motor will be just referred to as "upper" and the lower side as "lower". The up-down direction is not intended to indicate the positional relationship or the orientation when the motor is installed within an actual device. The direction parallel to the center axis will be referred to as "axial". The radial direction about the center axis will be just referred to as "radial". The circumferential direction about the center axis will be just referred to as "circumferential".

FIG. 1 is a section view of a spindle motor 1 according to one illustrative embodiment of the present invention. In the following description, the spindle motor 1 will be just referred to as "motor 1". The motor 1 is used in a 2.5 inch-type disk drive apparatus (e.g., a hard disk drive apparatus) having a thickness of 7 mm or less or a thickness of 5 mm or less. The disk drive apparatus preferably includes a motor 1, a housing, at least one disk, an access unit, a connector, and so forth. The disk is attached to the motor 1. The access unit performs at least one of information "reading" and "writing" tasks with respect to the disk. A base member makes up a portion of the housing in cooperation with a cover member. The housing accommodates, e.g., the motor 1, the disk and the access unit therein. That is to say, the housing is a case arranged to accommodate the motor 1 and at least one disk therein.

As shown in FIG. 1, the motor 1 is an outer-rotor-type motor. In the present embodiment, the motor 1 is a three-phase motor having three phases, namely a U-phase, a V-phase and a W-phase. The motor 1 preferably includes a stationary unit 2, a rotary unit 3 and a fluidic dynamic-pressure bearing mechanism 4 (hereinafter referred to as "bearing mechanism 4"). The rotary unit 3 is rotatable with respect to the stationary unit 2. More specifically, the rotary unit 3 is rotatably supported by the bearing mechanism 4 to rotate about the center axis J1 of the motor 1 with respect to the stationary unit 2.

The stationary unit 2 preferably includes a base member 21, a ring-shaped stator 22 and a wiring substrate 14. A first through-hole 210 is arranged in the base member 21 to axially extend through the base member 21. The stator 22 is arranged radially outward of the first through-hole 210. The stator 22 preferably includes a stator core 221 and at least one coil 222. The coil 222 is arranged in the stator core 221. In the stator 22, a plurality of lead wires 50 is led out from U-phase, V-phase and W-phase coils 222. The lead wires 50 extend from the upper surface of the base member 21 to the lower surface of the base member 21 through a second through-hole to be described later. The lead wires 50 are electrically connected to the wiring substrate 14. The respective lead wires 50 are connected to the wiring substrate 14 by, e.g., soldering (using a lead-containing solder or a lead-free solder). In the present preferred embodiment, the number of the lead wires 50 is three.

A flexible printed circuit board or a connector can be taken as one preferred example of the wiring substrate 14. The wiring substrate 14 is arranged on the lower surface of the base member 21. A portion of the wiring substrate 14 may or may not make contact with the lower surface of the base member 21.

The stator core 221 includes a core-back (not shown) and a plurality of teeth (not shown). The core-back is formed into a tubular shape about the center axis J1 to extend in the axial direction. The teeth extend radially outward from the outer circumference of the core-back. Each of the teeth includes a winding portion and a tip end portion. A lead wire is wound on the winding portion, thereby forming each of the coils 222. The tip end portion extends from the outer edge of the winding portion in the circumferential opposite directions.

As shown in FIG. 1, the rotary unit 3 preferably includes a rotor hub 31 and a rotor magnet 321. At least one disk is held on the rotor hub 31. The rotor hub 31 preferably includes a hub body 311, a cylinder portion 312, a ring-shaped disk placing portion 313 and a shaft 314. The cylinder portion 312 protrudes downward from the outer edge portion of the hub body 311. The disk placing portion 313 extends radially outward from the lower end of the cylinder portion 312. A disk is placed on the disk placing portion 313. The rotor magnet 321 has a substantially annular shape about the center axis J1. The rotor magnet 321 is arranged inside the cylinder portion 312. The disk placing portion 313 is positioned radially outward of the lower portion of the rotor magnet 321. The rotor magnet 321 is arranged radially outward of the stator 22. During the operation of the motor 1, torque is generated between the rotor magnet 321 and the stator 22. The shaft 314 is fixed to the hub body 311. During the rotation of the rotary unit 3, the shaft 314 rotates about the center axis J1.

As shown in FIG. 1, the bearing mechanism 4 is a fluidic dynamic-pressure bearing. The bearing mechanism 4 preferably includes a lubricant, a bearing 41 and a bushing 42. In the present preferred embodiment, the bearing 41 is a sleeve (hereinafter referred to as "sleeve 41"). The sleeve 41 is a substantially cylindrical member. The sleeve 41 preferably includes a communication hole 411 extending in the up-down direction.

The bushing 42 has a substantially cylindrical shape. The bushing 42 preferably includes a substantially tubular bearing holding portion 421. The bearing holding portion 421 holds the sleeve 41 therein. The inner surface of the bushing 42 (namely, the inner surface of the bearing holding portion 421) supports the sleeve 41. The lubricant exists between the shaft 314 and the sleeve 41. When the rotary unit 3 rotates with respect to the stationary unit 2, the sleeve 41 rotatably supports the shaft 314 through the lubricant.

The bushing 42 preferably includes a substantially tubular stator holding portion 422. The stator holding portion 422 extends axially upward from the bearing holding portion 421. The stator holding portion 422 holds the stator 22. The stator core 221 is fixed to the outer surface of the bushing 42 (namely, the outer surface of the stator holding portion 422) by press-fitting or caulking. An adhesive agent may be used in fixing the stator core 221.

The bushing 42 is arranged within the first through-hole 210 to be described later. The bushing 42 preferably includes a first protrusion portion 423. The first protrusion portion 423 extends radially outward from the upper portion of the bearing holding portion 421. The stator core 221 is axially opposed to the first protrusion portion 423. The inner surface of the stator core 221 is positioned radially inward of the radial outer end of the first protrusion portion 423. Preferably, at least a portion of the stator core 221 makes contact with the first protrusion portion 423. Alternatively, the stator core 221 may be opposed to the first protrusion portion 423 with a gap left therebetween.

Figure 2:
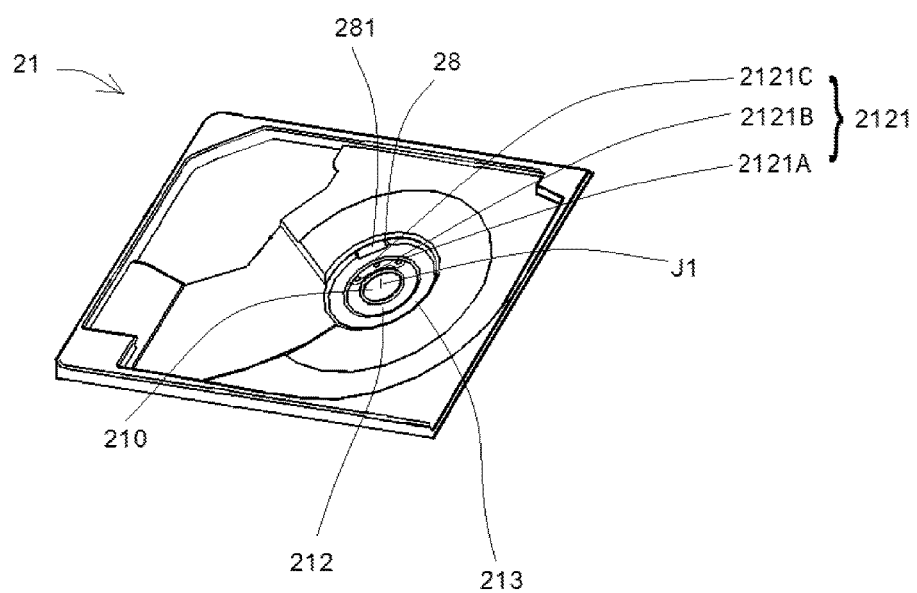
FIG. 2 is a top perspective view of a base member according to a preferred embodiment of the present invention.
Figure 3:
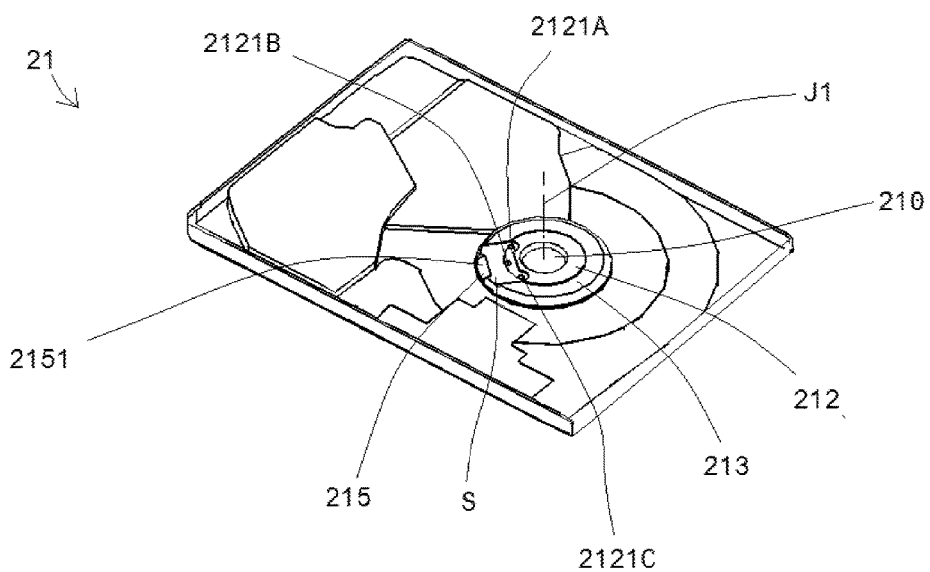
FIG. 3 is a bottom perspective view of the base member according to the preferred embodiment of the present invention.
Figure 4:
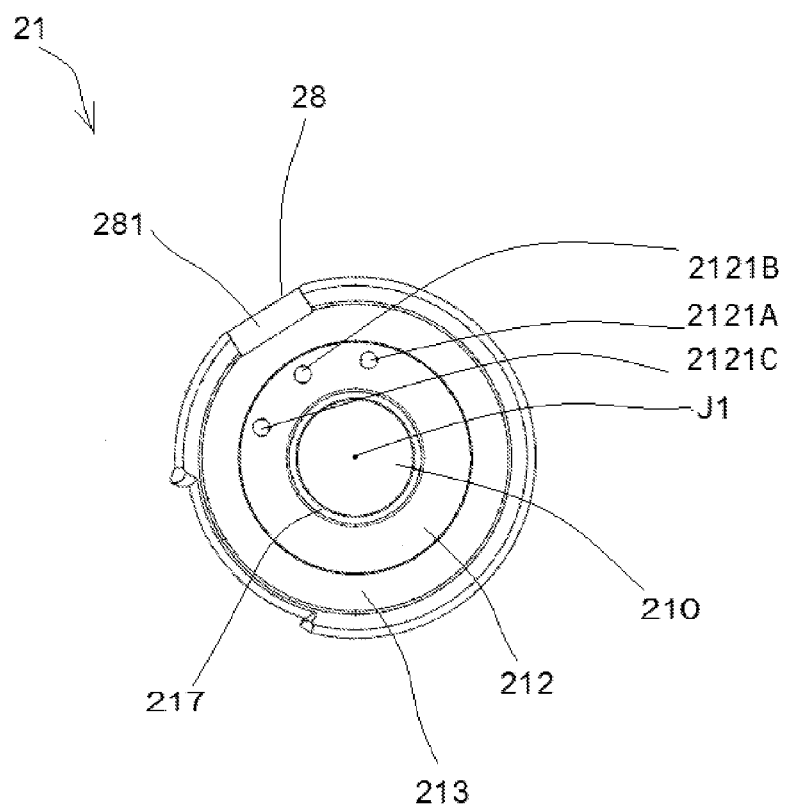
FIG. 4 is a partially enlarged top view of the base member according to the preferred embodiment of the present invention.
Figure 5:
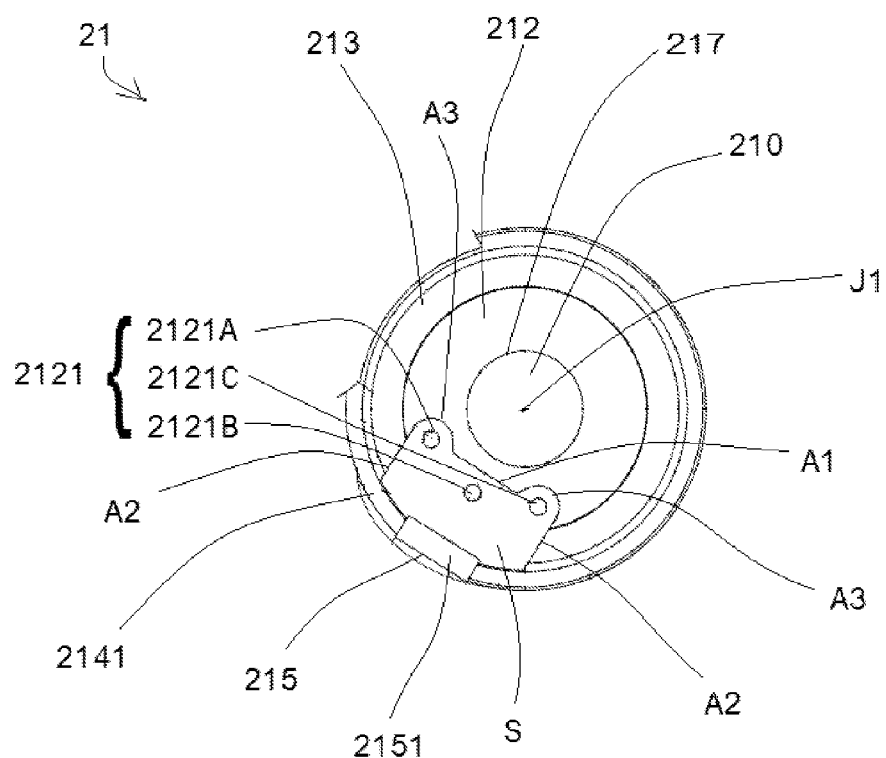
FIG. 5 is a partially enlarged bottom view of the base member according to the preferred embodiment of the present invention.

FIG. 2 is a perspective view of the base member 21, depicting the upper surface of the base member 21. FIG. 3 is a bottom perspective view of the base member 21. FIG. 4 is a partially enlarged view showing the first through-hole 210 and its vicinities on the upper surface of the base member 21. FIG. 5 is a partially enlarged view showing the first through-hole 210 and its vicinities on the lower surface of the base member 21. A base unit employed in the disk drive apparatus preferably includes a bearing, a thin flat base member and a bushing axially extending from the base member about a center axis. In other words, the stationary unit includes the base unit.

As shown in FIGS. 2 and 4, a first through-hole 210 is arranged in the base member 21. The first through-hole 210 is defined by a tubular inner surface radially opposed to the bearing holding portion 421. The first through-hole 210 axially extends through the base member 21. A first recess portion 212 is arranged around the first through-hole 210. In the present preferred embodiment, when axially seen, the first recess portion 212 is formed into a substantially annular shape about the center axis J1. The first recess portion 212 is a portion arranged on the upper surface of the base member 21 and depressed toward the lower surface of the base member 21. When assembling the motor 1, the first recess portion 212 is axially opposed to the stator 22. A second recess portion 213 is arranged radially outward of the first recess portion 212. The second recess portion 213 extends in the circumferential direction along the first recess portion 212. The second recess portion 213 is a portion arranged on the upper surface of the base member 21 and depressed toward the lower surface of the base member 21 (axially downward). In the present preferred embodiment, the second recess portion 213 is formed into a substantially annular shape about the center axis J1.

As shown in FIGS. 2 and 4, at least one second through-hole 2121 is arranged within the first recess portion 212. The second through-hole 2121 axially extends through the base member 21. In the present preferred embodiment, there are arranged three second through-holes 2121 (namely, a first hole 2121A, a second hole 2121B and a third hole 2121C). The respective second through-holes 2121 are circumferentially spaced apart from one another. In other words, a first hole 2121A, a second hole 2121B and a third hole 2121C are sequentially arranged along the circumferential direction within the first recess portion 212. The first hole 2121A, the second hole 2121B and the third hole 2121C are arranged on a concentric circle about the center axis J1.

A protrusion portion 28 is arranged on the inner surface of the second recess portion 213. The protrusion portion 28 protrudes from the lower surface of the base member 21 toward the upper surface thereof. The protrusion portion 28 extends in the circumferential direction along the inner surface of the second recess portion 213. The protrusion portion 28 preferably includes an upper slant surface 281 inclined with respect to the center axis J1.

As shown in FIGS. 1, 3 and 5, the bottom of the first recess portion 212 and the bottom of the second recess portion 213 protrude axially below the lower surface of the base member 21. The bottom of the second recess portion 213 is positioned axially above the bottom of the first recess portion 212. In other words, the bottom of the first recess portion 212 protrudes axially below the bottom of the second recess portion 213. The bottom of the first recess portion 212 and the bottom of the second recess portion 213 are respectively formed into a substantially annular shape about the center axis J1. A third recess portion 215 is arranged in the peripheral edge portion of the bottom of the second recess portion 213. The third recess portion 215 is depressed from the lower surface of the base member 21 toward the upper surface thereof. The circumferential position of the third recess portion 215 is substantially the same as the circumferential position of the protrusion portion 28. The radial position of the third recess portion 215 is substantially the same as the radial position of the protrusion portion 28. In the axial direction, the third recess portion 215 is positioned at the opposite side from the protrusion portion 28.

Thus, the protrusion portion 28 serves as a so-called rib. As a result, even if the thickness of the base member 21 is made small, the rigidity of the periphery of the second recess portion 213 is prevented from going down.

On the lower surface of the base member 21, there is provided a coplanar surface S straddling both the bottom of the first recess portion 212 and the bottom of the second recess portion 213.

The third recess portion 215 preferably includes a lower slant surface 2151 inclined with respect to the center axis J1. The lower slant surface 2151 is substantially parallel to the upper slant surface 281. When axially seen, the contour of the lower slant surface 2151 is substantially rectangular.

As shown in FIGS. 3 and 5, the lower surface of the base member 21 positioned between the first hole 2121A and the second hole 2121B is a portion of the coplanar surface S. The lower surface of the base member 21 positioned between the second hole 2121B and the third hole 2121C is a portion of the coplanar surface S. The lower surface of the base member 21 positioned between the second hole 2121B and the bottom of the second recess portion 213 existing radially outward of the second hole 2121B is a portion of the coplanar surface S.

More specifically, a portion of the bottom of the first recess portion 212 and a portion of the bottom of the second recess portion 213 exist on the coplanar surface S. The coplanar surface S is a region surrounded by a peripheral edge portion 2141 of the second recess portion 213 including the third recess portion 215, a first side portion A1 and a pair of second side portions A2. The first side portion A1 is a portion radially opposed to the peripheral edge portion 2141 of the second recess portion 213. In the present preferred embodiment, the first side portion A1 and the second side portions A2 are substantially rectilinear. The first side portion A1 is substantially parallel to at least one side of the lower slant surface 2151. Arc portions A3 are provided to interconnect the first side portion A1 and the second side portions A2. The arc portions A3 are circumferentially opposed to the first hole 2121A and the third hole 2121C. The arc portions A3 are positioned radially inward of the first side portion A1. When axially seen, the contour of each of the arc portions A3 has a substantially arc-like shape. The second hole 2121B is positioned on an imaginary straight line interconnecting the center axis J1 and the third recess portion 215.

The first side portion A1 and the second side portions A2 may be curvilinear. The first side portion A1 may not be parallel to the lower slant surface 2151. The second side portions A2 may not be parallel to each other. When axially seen, the contour of each of the arc portions A3 may not have an arc-like shape and may have other shapes. For example, the contour of each of the arc portions A3 may be rectilinear, may be a portion of a polygon or may be curvilinear. No particular restriction is imposed on the shape of the arc portions A3.

The first recess portion 212 preferably includes a thin portion 218 to be described later and a portion whose axial dimension is larger than the axial dimension of the thin portion 218 but smaller than the axial dimension of a peripheral edge portion 217 to be described later.

As shown in FIG. 1, the wiring substrate 14 is arranged on the lower surface of the base member 21. More specifically, the wiring substrate 14 is arranged on the lower surface of the base member 21 including the lower surface of a thin portion 218 to be described later. The wiring substrate 14 is fixed to the lower surface of the base member 21 by way of a sticky material or an adhesive agent. A portion of the wiring substrate 14 is arranged on the coplanar surface S. The end portion of the wiring substrate 14 is radially opposed to the bottom of the first recess portion 212. The wiring substrate 14 makes contact with a portion of the bottom of the first recess portion 212 and the bottom of the second recess portion 213 in the axial direction. The wiring substrate 14 extends radially outward from the coplanar surface S to the lower surface of the base member 21 through the third recess portion 215. The wiring substrate 14 makes contact with the lower slant surface 2151 of the third recess portion 215.

The lead wires 50 are led out from the coils 222. In the present preferred embodiment, the motor 1 is a three-phase motor. For that reason, the lead wires 50 are led out from the U-phase, V-phase and W-phase coils 222 in a one-to-one relationship. The lead wires 50 are led out from the upper surface of the base member 21 to the lower surface of the base member 21 through the first hole 2121A, the second hole 2121B and the third hole 2121C, respectively. On the lower surface of the base member 21, the lead wires 50 run across the coplanar surface S and go toward the position where the lower slant surface 2151 exists. In the position where the lower slant surface 2151 exists, the lead wires 50 are electrically connected to the wiring substrate 14. The lead wires 50 are connected to the wiring substrate 14 by, e.g., soldering (using a lead-containing solder or a lead-free solder). Fixing portions 501 are formed by the soldering. The lower slant surface 2151 is positioned axially above the bottom of the first recess portion 212 and the bottom of the second recess portion 213. For that reason, if the lead wires 50 are connected to the wiring substrate 14 in the position where the lower slant surface 2151 exists, the fixing portions 501 are positioned axially above the bottom of the first recess portion 212. As a result, the thickness of the motor 1 can be kept within the thickness of the base member 21.

At least a portion of the coplanar surface S may be covered with a resin material. In this case, the lead wires 50 existing on the coplanar surface S are fixed on the coplanar surface S by the resin material. The respective second through-holes 2121 are closed by the resin material. Consequently, the lead wires 50 passing through the respective second through-holes 2121 are fixed within the second through-holes 2121. As a result, even if a shock is applied from the outside to the motor 1, the lead wires 50 is prevented from getting out of the wiring substrate 14 or the coplanar surface S. Since the respective second through-holes 2121 are closed by the resin material, dust or the like is prevented from entering the inside of the motor 1 from the outside. For instance, an adhesive agent is used as the resin material.

As shown in FIG. 1, an insulating sheet 80 is arranged within the first recess portion 212. The insulating sheet 80 has a substantially annular shape about the center axis J1. The insulating sheet 80 is axially opposed to the coils 222. The insulating sheet 80 is opposed to the radial outer surface of the first recess portion 212. Consequently, the insulating sheet 80 is located within the first recess portion 212. For that reason, even when the coils 222 make contact with the base member 21, it becomes possible to insulate the coils 222 and the base member 21 from each other.

Alternatively, a plurality of insulating sheets 80 may be arranged side by side along the circumferential direction in an axially opposing relationship with the coils 222. In this case, when seen in a plan view, each of the insulating sheets 80 may have a polygonal shape such as a rectangular shape or a triangular shape, a circular shape, an elliptical shape, a fan-like shape, or many other shapes. No particular restriction is imposed on the shape of each of the insulating sheets 80. The insulating sheets 80 may be fixed to the base member 21 by a sticky material or an adhesive agent or may be arranged within the first recess portion 212 with no use of a sticky material or an adhesive agent.

The base member 21 is formed by a process including press works. First, a flat raw member is arranged within a mold. A series of press works is performed with respect to the raw member, thereby forming the base member 21 which includes the first recess portion 212, the second recess portion 213, the third recess portion 215, the second through-holes 2121 and so forth. During the press works, the protrusion portion 28 positioned at the axially opposite side of the third recess portion 215 is formed in the base member 21 simultaneously with the formation of the third recess portion 215. For that reason, the shape of the protrusion portion 28 is substantially similar to the shape of the third recess portion 215.

In the base member 21 which has been subjected to the press works, a cutting work is carried out on the inner surface 2101 defining the first through-hole 210. Thus, the inner surface 2101 defining the first through-hole 210 is formed with high accuracy. As a result, the bushing 42 is accurately arranged within the first through-hole 210.

On the lower surface of the base member 21, the coplanar surface S is formed by a cutting work such as milling or the like. Thus, the bottom of the first recess portion 212 and the bottom of the second recess portion 213 can be made as thin as possible within a thickness capable of maintaining the rigidity thereof. As a result, it becomes possible to reduce the thickness of the disk drive apparatus including the motor 1.

Within the mold, the portions other than the inner surface 2101 defining the first through-hole 210, such as the entire upper and lower surfaces of the base member 21, the first recess portion 212, the second recess portion 213, the third recess portion 215 and the edge of the first through-hole 210, may be subjected to a cutting work as well as the press works.

In the base member 21 which has been subjected to the press works, undercuts or burrs are formed in the end portions of at least one of the second through-holes 2121 and the outer peripheral edges of the base member 21 as the raw member is punched with a mold. In particular, a cutting work may be performed with respect to the burrs formed by the press works. If the burrs are removed by the cutting work, the end portions of the second through-holes 2121 become smooth. Therefore, when assembling the base member 21, the components such as the stator 22 and the like are attached with no likelihood of getting damaged.

A plating work is performed with respect to the base member 21 which has been subjected to the press works and the cutting work. For example, nickel-based metal is used as a plating metal. By virtue of the plating work, the base member 21 is wholly covered with a thin film of the plating metal. The thickness of the thin film may be, e.g., from 2 μm to 10 μm. Accordingly, it is possible to prevent the base member 21 from being corroded by the lubricant of the bearing mechanism 4 or due to the external environment.

Figure 6:
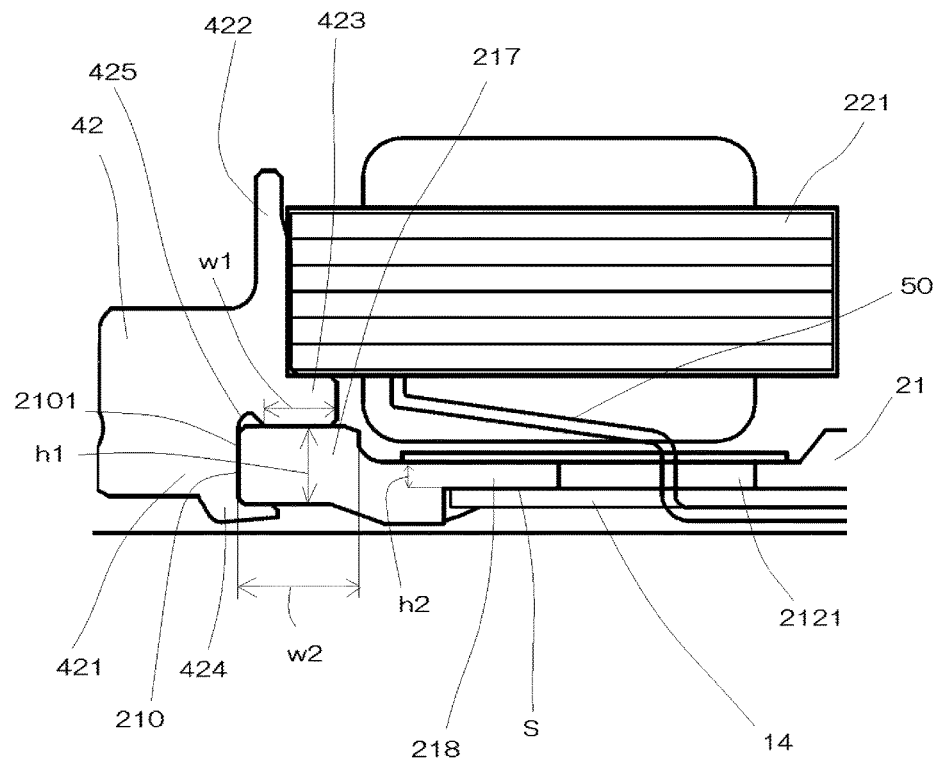
FIG. 6 is a partial section view of the motor according to the preferred embodiment of the present invention.

FIG. 6 is an enlarged view of the bushing 42 and its vicinities. As shown in FIGS. 1 and 6, the base member 21 preferably includes a peripheral edge portion 217 extending radially outward from the first through-hole 210. When axially seen, the contour of the peripheral edge portion 217 has a substantially annular shape. The first through-hole 210 is formed in the peripheral edge portion 217. The lower surface of the peripheral edge portion 217 is positioned axially above the bottom of the first recess portion 212.

The first protrusion portion 423 extends in the circumferential direction along the outer surface of the bearing holding portion 421. The first protrusion portion 423 is arranged on the outer surface of the bearing holding portion 421 to have a substantially annular shape. The first protrusion portion 423 extends radially outward. The first protrusion portion 423 is arranged axially above the peripheral edge portion 217 and is axially opposed to the peripheral edge portion 217. Preferably, the first protrusion portion 423 makes contact with the peripheral edge portion 217 in the axial direction. The first protrusion portion 423 is arranged axially below the stator core 221 and is axially opposed to the stator core 221. Preferably, the first protrusion portion 423 makes contact with the stator core 221 in the axial direction. The outer surface of the stator holding portion 422 is arranged radially inward of the radial outer end of the first protrusion portion 423.

At least one first groove portion 425 is arranged in a region of the bearing holding portion 421 where the first protrusion portion 423 is connected to the bearing holding portion 421. The first groove portion 425 is depressed in at least one of an axial upward direction and a radial inward direction. The first groove portion 425 is axially or radially or axially and radially opposed to at least a portion of the peripheral edge portion 217.

The radial length w1 of the region of the first protrusion portion 423 axially opposed to the peripheral edge portion 217 is smaller than the radial length w2 of the peripheral edge portion 217.

As shown in FIGS. 1 and 6, the bushing 42 preferably includes a second protrusion portion 424. Preferably, the second protrusion portion 424 has a substantially annular shape about the center axis J1. The second protrusion portion 424 extends radially outward from the lower end of the bearing holding portion 421. The second protrusion portion 424 is arranged axially above at least a portion of the lower surface of the base member 21. The second protrusion portion 424 protrudes axially below the lower end surface of the bearing holding portion 421. The second protrusion portion 424 is arranged axially below the first protrusion portion 423. The second protrusion portion 424 is arranged axially below the peripheral edge portion 217. At least a portion of the second protrusion portion 424 is axially opposed to the peripheral edge portion 217. The second protrusion portion 424 is axially overlapped with at least a portion of the peripheral edge portion 217. In other words, the second protrusion portion 424 extends radially outward along the lower surface of the peripheral edge portion 217. As stated above, the first protrusion portion 423 is axially opposed to the peripheral edge portion 217. For that reason, the peripheral edge portion 217 is arranged between the first protrusion portion 423 and the second protrusion portion 424. Preferably, the peripheral edge portion 217 makes contact with the first protrusion portion 423 and the second protrusion portion 424. The radial outer end of the second protrusion portion 424 is arranged radially inward of the radial outer end of the first protrusion portion 423. The outer surface of the stator holding portion 422 is arranged radially outward of the radial outer end of the second protrusion portion 424.

The second protrusion portion 424 is arranged axially above at least a portion of the lower surface of the base member 21. In other words, the lower end of the second protrusion portion 424 is prevented from protruding axially below the lower surface of the base member 21.

Prior to being fixed to the base member 21, the second protrusion portion 424 extends axially downward. When the bushing 42 is attached to the base member 21, the second protrusion portion 424 extending axially downward is plastically deformed by a tool so as to extend radially outward. That is to say, the bushing 42 is fixed to the base member 21 by caulking. The second protrusion portion 424 makes contact with the lower edge or the lower surface of the peripheral edge portion 217. The second protrusion portion 424 is inclined axially upward with respect to the direction perpendicular to the center axis J1. In the present preferred embodiment, the angle between the caulked second protrusion portion 424 and the center axis J1 is equal to or larger than 90 degrees. As mentioned above, the first protrusion portion 423 is axially opposed to the peripheral edge portion 217. Preferably, the first protrusion portion 423 makes contact with the peripheral edge portion 217. For that reason, the peripheral edge portion 217 is arranged between the first protrusion portion 423 and the second protrusion portion 424. The peripheral edge portion 217 is axially gripped by the first protrusion portion 423 and the second protrusion portion 424.

The second protrusion portion 424 may extend not only in the direction perpendicular to or substantially perpendicular to the center axis J1 but also in many other directions. For example, the second protrusion portion 424 may obliquely extend in the direction inclined with respect to the center axis J1. The angle between the caulked second protrusion portion 424 and the center axis J1 may be smaller than 90 degrees. Even in this case, the lower end of the second protrusion portion 424 is arranged more upward than the lower surface of the base member 21.

At least one recess portion in which a portion of the second protrusion portion 424 is positioned may be arranged on the axial lower surface of the peripheral edge portion 217.

A caulking work and an adhesive agent may be used in combination in fixing the bushing 42 and the base member 21 together. With this configuration, it is possible to strongly fix the bushing 42 to the base member 21. By arranging an adhesive agent between the bushing 42 and the base member 21, it is possible to restrain a gas from flowing through between the bushing 42 and the base member 21. An adhesive agent may be arranged between the peripheral edge portion 217 and the first protrusion portion 423, between the peripheral edge portion 217 and the second protrusion portion 424, or both. Even in this case, the peripheral edge portion 217 is strongly fixed to at least one of the first protrusion portion 423 and the second protrusion portion 424. If the adhesive agent is arranged between the first protrusion portion 423 and the peripheral edge portion 217, a part of the adhesive agent flows into the first groove portion 425. Thus, the contact area between the adhesive agent and the bushing 42 is increased and the base member 21 is firmly fixed to the bushing 42. Since apart of the adhesive agent flows into the first groove portion 425, the adhesive agent existing between the peripheral edge portion 217 and the first protrusion portion 423 is prevented from being extruded radially outward of the first protrusion portion 423.

The base member 21 preferably includes a thin portion 218. The thin portion 218 is a portion interposed between the coplanar surface S and the bottom of the first recess portion 212. At least one second through-hole 2121 is arranged in the thin portion 218. The thin portion 218 extends in the circumferential direction about the center axis J1. The thin portion 218 is arranged radially outward of the peripheral edge portion 217. The axial thickness h1 of the peripheral edge portion 217 is larger than the axial thickness h2 of the thin portion 218. In other words, the axial thickness h2 (the axial distance between the coplanar surface S and the bottom of the first recess portion 212) is smaller than the axial thickness h1 of the peripheral edge portion 217. The thin portion 218 denotes a portion existing radially outward of the peripheral edge portion 217 and having a thickness smaller than the axial thickness h1 of the peripheral edge portion 217. The thickness is equal to h2 in a portion of the thin portion 218 where the axial thickness of the thin portion 218 is smallest.

The thin portion 218 is arranged radially outward of the radial outer end of the first protrusion portion 423. The thin portion 218 is arranged radially outward of the radial outer end of the second protrusion portion 424. The second protrusion portion 424 is arranged axially below the lower surface of the thin portion 218. The lower surface of the thin portion 218 is arranged axially above the lower surface of the peripheral edge portion 217. The lower surface of the peripheral edge portion 217 is arranged axially above the lower surface of the base member 21. For that reason, at least a portion of the second protrusion portion 424 is arranged between the lower surface of the peripheral edge portion 217 and the lower surface of the base member 21 in the axial direction. The wiring substrate 14 is arranged on the lower surface of the base member 21 including the thin portion 218. On the lower surface of the base member 21, the lead wires 50 are electrically connected to the wiring substrate 14 at the radial outer side of the thin portion 218. That is to say, the fixing portions 501 are positioned radially outward of the thin portion 218.

A plurality of first protrusion portions 423 may be arranged on the outer surface of the bearing holding portion 421 with a gap left therebetween in the circumferential direction. In this case, the circumferential widths of the respective first protrusion portions 423 may be equal to one another or may differ from one another. However, the upper surfaces of the respective first protrusion portions 423 are axially opposed to the stator core 221. For that reason, it is preferred that the axial positions of the upper surfaces of the respective first protrusion portions 423 be identical with one another.

The bearing holding portion 421 may include a plurality of second protrusion portions 424. In this case, it is preferred that at least one of the second protrusion portions 424 be axially opposed to the peripheral edge portion 217.

Figure 7:
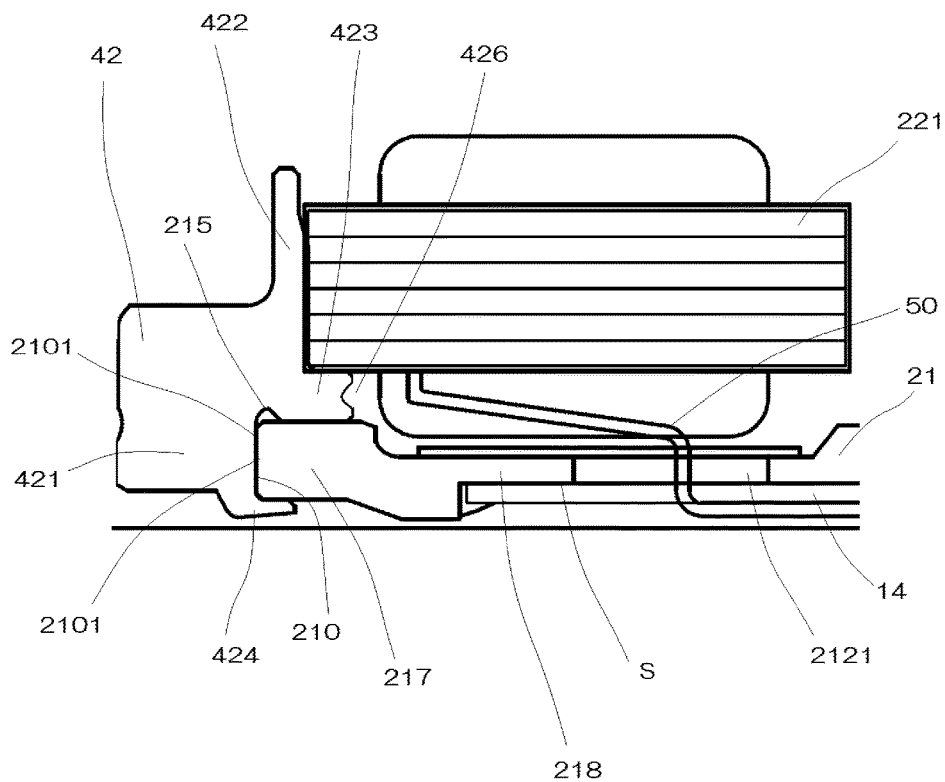
FIG. 7 is a partial section view of a motor according to a preferred modified example.

FIG. 7 shows one modified example of the preferred embodiment. As shown in FIG. 7, a second groove portion 426 depressed radially inward is arranged in a radial outer end portion of the first protrusion portion 423. The second groove portion 426 extends in the circumferential direction along the radial outer end portion of the first protrusion portion 423. In the modified example shown in FIG. 7, the second groove portion 426 is substantially annularly arranged in the radial outer end portion of the first protrusion portion 423.

If the stator core 221, when installed in the stator holding portion 422, makes strong contact with the first protrusion portion 423 in the axial direction, the axial width of the second groove portion 426 becomes smaller. Thus, the first protrusion portion 423 is restrained from being deformed by the stator core 221.

A plurality of second groove portions 426 may be arranged in the radial outer end portion of the first protrusion portion 423 with a gap left therebetween in the circumferential direction. In this case, the shapes of the second groove portions 426 may differ from one another or may be identical with one another. No particular restriction is imposed on the shapes of the second groove portions 426.

Figure 8:
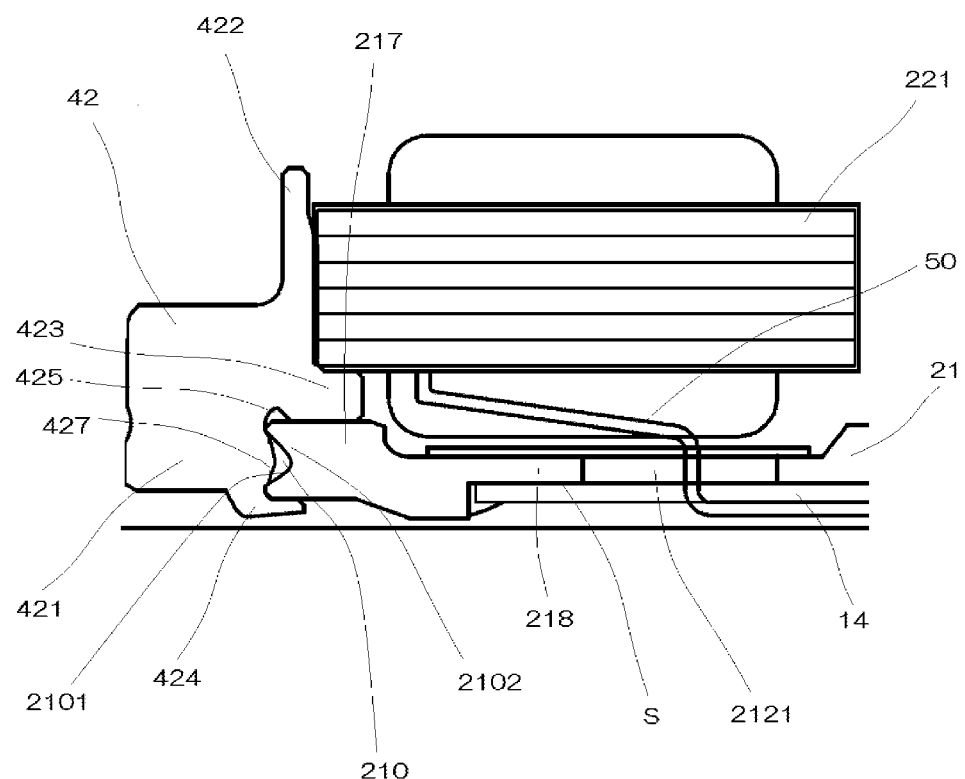
FIG. 8 is a partial section view of a motor according to a preferred modified example.

FIG. 8 shows another modified example of the preferred embodiment. As shown in FIG. 8, at least one first bushing restraint portion 427 may be arranged on the outer surface of the bearing holding portion 421. The first bushing restraint portion 427 is a radially depressed or bulged portion. At least one first base restraint portion 2102 may be arranged on the inner surface 2101 of the base member 21. The first base restraint portion 2102 is radially bulged or depressed in a corresponding relationship with the first bushing restraint portion 427. The first bushing restraint portion 427 is radially opposed to the first base restraint portion 2102.

More specifically, the inner surface 2101 of the peripheral edge portion 217 defining the first through-hole 210 includes the first base restraint portion 2102 depressed radially outward. The first base restraint portion 2102 extends in the circumferential direction along the inner surface 2101 of the base member 21. In the modified example shown in FIG. 8, the first base restraint portion 2102 is substantially annularly arranged on the inner surface 2101.

As shown in FIG. 8, the outer surface of the bearing holding portion 421 includes the first bushing restraint portion 427 bulged radially outward. The first bushing restraint portion 427 is radially opposed to the first base restraint portion 2102 of the peripheral edge portion 217. The first bushing restraint portion 427 is axially opposed to the axial upper and lower portions defining the first base restraint portion 2102. The axial upper portion of the first base restraint portion 2102 is arranged between the first protrusion portion 423 and the first bushing restraint portion 427. The axial lower portion of the first base restraint portion 2102 is arranged between the first bushing restraint portion 427 and the second protrusion portion 424. Preferably, the axial upper portion of the first base restraint portion 2102 is caulked by the first protrusion portion 423 and the first bushing restraint portion 427. The axial lower portion of the first base restraint portion 2102 is caulked by the first bushing restraint portion 427 and the second protrusion portion 424. As stated above, it is preferred that the peripheral edge portion 217 is axially caulked by the first protrusion portion 423 and the second protrusion portion 424. As a consequence, the base member 21 is fixed with respect to the bushing 42.

A plurality of first base restraint portions 2102 may be arranged on the inner surface 2101 of the peripheral edge portion 217. Preferably, the first base restraint portions 2102 are arranged on the inner surface 2101 with a gap left therebetween in the circumferential direction. In this case, the bearing holding portion 421 includes a plurality of first bushing restraint portions 427 corresponding to the respective first base restraint portions 2102. The respective first bushing restraint portions 427 are radially opposed to the respective first base restraint portions 2102. The respective first bushing restraint portions 427 arranged within the respective first base restraint portions 2102 are axially interposed between the inner surfaces defining the first base restraint portions 2102. Consequently, the base member 21 is fixed with respect to the bushing 42. Moreover, the base member 21 is prevented from axially moving with respect to the bushing 42. In addition, the respective first bushing restraint portions 427 arranged within the respective first base restraint portions 2102 are circumferentially opposed to the inner surfaces defining the first base restraint portions 2102. If the base member 21 is circumferentially moved with respect to the bushing 42, the first bushing restraint portions 427 come into contact with the first base restraint portions 2102. As a result, the base member 21 is restrained from circumferentially moving with respect to the bushing 42.

There may be provided only one first base restraint portion 2102 and only one first bushing restraint portion 427. Even in this case, just like the case where there are provided a plurality of first base restraint portions 2102 and a plurality of first bushing restraint portions 427, the bushing 42 is restrained from circumferentially moving with respect to the base member 21.

At least one first bushing restraint portion 427 need not necessarily make contact with the inner surface 2101. In other words, the first bushing restraint portion 427 may be opposed to the inner surface 2101 with a gap left therebetween. If a portion of at least one first bushing restraint portion 427 is arranged within the first base restraint portion 2102, it is possible to restrain the base member 21 from circumferentially moving with respect to the bushing 42. By arranging at least a portion of the first bushing restraint portion 427 within the first base restraint portion 2102, it is possible to restrain the base member 21 from moving axially upward or axially downward with respect to the bushing 42.

Figure 9:
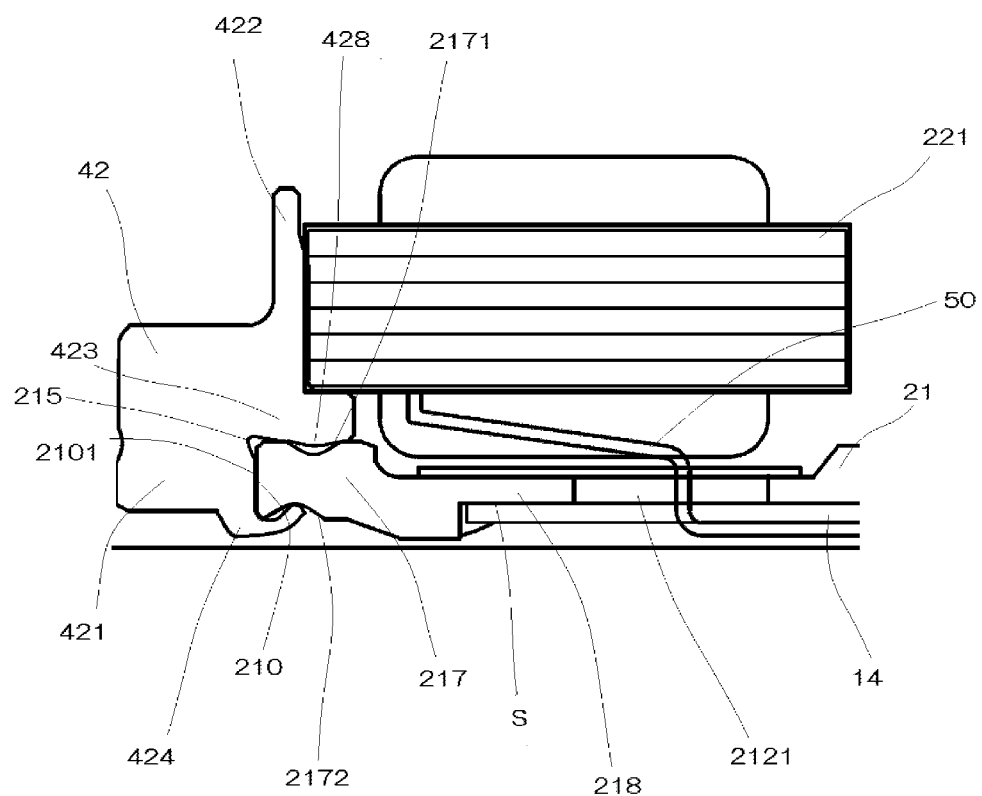
FIG. 9 is a partial section view of a motor according to a preferred modified example.

FIG. 9 shows a further modified example of the preferred embodiment. As shown in FIG. 9, at least one second base restraint portion 2171 depressed or bulged in the axial direction may be arranged on the upper surface of the peripheral edge portion 217. In this case, a second bushing restraint portion 428 axially depressed or bulged in a corresponding relationship with the second base restraint portion 2171 is arranged on the axial lower surface of the first protrusion portion 423. The second bushing restraint portion 428 is axially opposed to the second base restraint portion 2171. In addition, at least one third base restraint portion 2172 depressed or bulged in the axial direction may be arranged on the lower surface of the peripheral edge portion 217. The third base restraint portion 2172 is axially opposed to the second protrusion portion 424.

More specifically, a second base restraint portion 2171 depressed axially downward is arranged on the upper surface of the peripheral edge portion 217. A third base restraint portion 2172 depressed axially upward is arranged on the lower surface of the peripheral edge portion 217. In the peripheral edge portion 217, the second base restraint portion 2171 is arranged radially outward of the third base restraint portion 2172.

The radial position of the second base restraint portion 2171 may be identical with the radial position of the third base restraint portion 2172. The second base restraint portion 2171 may be arranged radially inward of the third base restraint portion 2172.

As shown in FIG. 9, a second bushing restraint portion 428 protruding axially downward is arranged on the axial lower surface of the first protrusion portion 423. The second bushing restraint portion 428 is axially opposed to the second base restraint portion 2171 of the peripheral edge portion 217. The radial position of the second bushing restraint portion 428 of the first protrusion portion 423 is identical with the radial position of the second base restraint portion 2171 of the peripheral edge portion 217.

At least a portion of the second protrusion portion 424 is axially opposed to the third base restraint portion 2172. At least a portion of the second protrusion portion 424 is arranged within the third base restraint portion 2172. In the modified example shown in FIG. 9, the radial position of the radial outer end of the second protrusion portion 424 is identical with the radial position of the third base restraint portion 2172.

The inner surface 2101 defining the first through-hole 210 is radially opposed to the outer surface of the bearing holding portion 421. Preferably, the inner surface 2101 makes contact with the outer surface of the bearing holding portion 421. Thus, the base member 21 is radially located with respect to the bearing holding portion 421. The peripheral edge portion 217 is arranged between the second bushing restraint portion 428 and the second protrusion portion 424. The peripheral edge portion 217 is gripped by the second bushing restraint portion 428 and the second protrusion portion 424. Thus, the base member 21 is fixed with respect to the bearing holding portion 421. If the base member 21 is circumferentially moved with respect to the bearing holding portion 421, the second bushing restraint portion 428 comes into contact with the second base restraint portion 2171. For that reason, the base member 21 is restrained from circumferentially moving with respect to the bearing holding portion 421. In other words, the second bushing restraint portion 428 and the second base restraint portion 2171 perform an anti-rotation function.

Both the second base restraint portion 2171 and the third base restraint portion 2172 need not be necessarily arranged in the peripheral edge portion 217. Only one of the second base restraint portion 2171 and the third base restraint portion 2172 may be arranged in the peripheral edge portion 217.

The peripheral edge portion 217 may include a plurality of second base restraint portions 2171. In this case, it is preferred that the second base restraint portions 2171 be arranged with a gap left therebetween in the circumferential direction. More preferably, the respective second base restraint portions 2171 are arranged at a regular interval in the circumferential direction. The first protrusion portion 423 includes a plurality of second bushing restraint portions 428. The respective second bushing restraint portions 428 correspond to the respective second base restraint portions 2171. The second base restraint portions 2171 may substantially annularly extend in the circumferential direction. In this case, the second bushing restraint portion 428 may be plural and may have a substantially annular shape. In case where there is arranged a plurality of second bushing restraint portions 428, the contours of the respective second bushing restraint portion 428 may be identical with one another or may differ from one another. It is preferred that the shapes of the second base restraint portions 2171 be appropriately changed in conformity with the contours of the respective second bushing restraint portion 428.

The second protrusion portion 424 may have an annular shape and may be plural or single. It is preferred that the second protrusion portion 424 be arranged in an annular shape or arranged in a plural number. In case where the second protrusion portion 424 extends substantially annularly in the circumferential direction, it is preferred that the third base restraint portion 2172 has a substantially annular shape in a corresponding relationship with the second protrusion portion 424. In case where there is arranged a plurality of second protrusion portion 424, it is preferred that a plurality of third base restraint portions 2172 be arranged in a corresponding relationship with the second protrusion portion 424. When the bushing 42 is attached to the base member 21, at least a portion of each of the second protrusion portions 424 comes into each of the third base restraint portions 2172. The peripheral edge portion 217 is axially interposed between at least one third base restraint portion 2172 and at least one second protrusion portion 424. It is therefore possible to restrain the base member 21 from circumferentially moving with respect to the bushing 42.

In case where there is arranged a plurality of second protrusion portions 424, the third base restraint portion 2172 may extend substantially annularly in the circumferential direction. Even in this case, at least one of the second protrusion portions 424 makes contact with the third base restraint portion 2172. Accordingly, it is possible to restrain the base member 21 from moving with respect to the bushing 42 in at least one of the circumferential direction and the axial direction.

In the modified example shown in FIG. 9, the first protrusion portion 423 includes the second bushing restraint portion 428. The peripheral edge portion 217 includes the second base restraint portion 2171 and the third base restraint portion 2172. However, the bulged portion and the depressed portion may be reversely arranged in the first protrusion portion 423 and the peripheral edge portion 217. For example, the first protrusion portion 423 may include at least one second bushing restraint portion 428A (not shown) depressed axially upward. In this case, at least one second base restraint portion 2171A (not shown) bulged axially upward in a corresponding relationship with the second bushing restraint portion 428A is arranged on the upper surface of the peripheral edge portion 217. The second bushing restraint portion 428A comes into engagement with the second base restraint portion 2171A. Accordingly, it is possible to restrain the bearing holding portion 421 from circumferentially moving with respect to the peripheral edge portion 217.

Similarly, the third base restraint portion 2172 may be bulged axially downward. Even in this case, the second protrusion portion 424 makes contact with the third base restraint portion 2172, thereby fixing the base member 21 to the bushing 42. In this case, it is preferred that the axial lower end of the second protrusion portion 424 does not protrude axially below the lower surface of the base member 21. This makes it possible to reduce the axial thickness of the motor 1.

The first protrusion portion 423 may include two kinds of second bushing restraint portions 428 and 428A, one of which is bulged and the other of which is depressed. In this case, the peripheral edge portion 217 includes two second base restraint portions 2171 and 2171A corresponding to the second bushing restraint portions 428 and 428A. When the base member 21 is attached to the bushing 42, the second bushing restraint portions 428 and 428A come into engagement with the second base restraint portions 2171 and 2171A. This restrains the bushing 42 from circumferentially moving with respect to the base member 21.

The second bushing restraint portions 428 and 428A may be opposed to the second base restraint portions 2171 and 2171A with or without a gap left therebetween. At least a portion of the second bushing restraint portions 428 and 428A makes contact with the second base restraint portions 2171 and 2171A, whereby the peripheral edge portion 217 is fixed with respect to the bushing 42. The second protrusion portion 424 may be opposed to the third base restraint portion 2172 with or without a gap left therebetween. At least a portion of the second protrusion portion 424 makes contact with the third base restraint portion 2172, whereby the peripheral edge portion 217 is fixed with respect to the bushing 42 by the first protrusion portion 423 and the second protrusion portion 424.

While the preferred embodiment of the present invention and the modified examples thereof have been described above, the present invention can be modified in many other different forms.

Figure 10:
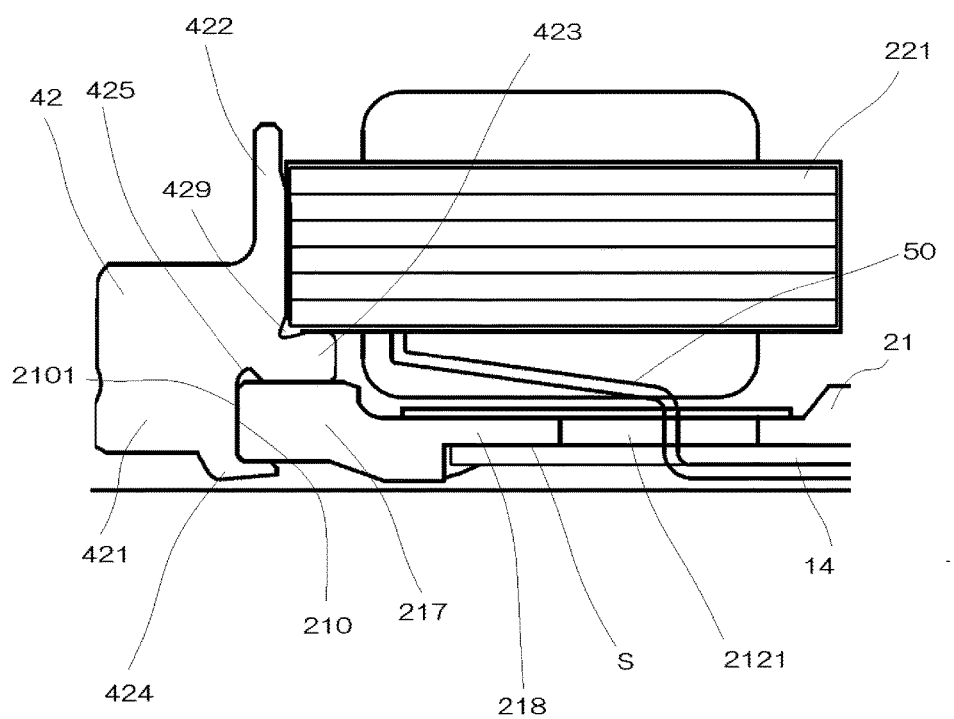
FIG. 10 is a partial section view of a motor according to a preferred modified example.

For example, a bushing groove portion 429 depressed axially downward may be arranged on the upper surface of the first protrusion portion 423. More specifically, a bushing groove portion 429 may be arranged in a region where the first protrusion portion 423 is joined to the stator holding portion 422. FIG. 10 shows a still further modified example of the preferred embodiment. The bushing groove portion 429 is depressed axially downward from the upper surface of the first protrusion portion 423. Preferably, as shown in FIG. 10, the bushing groove portion 429 is radially depressed from one of the stator holding portion 422 and the first protrusion portion 423. The bushing groove portion 429 extends substantially annularly in the circumferential direction. The axial end portion of the stator core 221 is opposed to the bushing groove portion 429. Preferably, at least a portion of the axial end portion of the stator core 221 is arranged within the bushing groove portion 429. More specifically, the axial lower edge of the inner surface of the core-back is opposed to the bushing groove portion 429.

Figure 11:
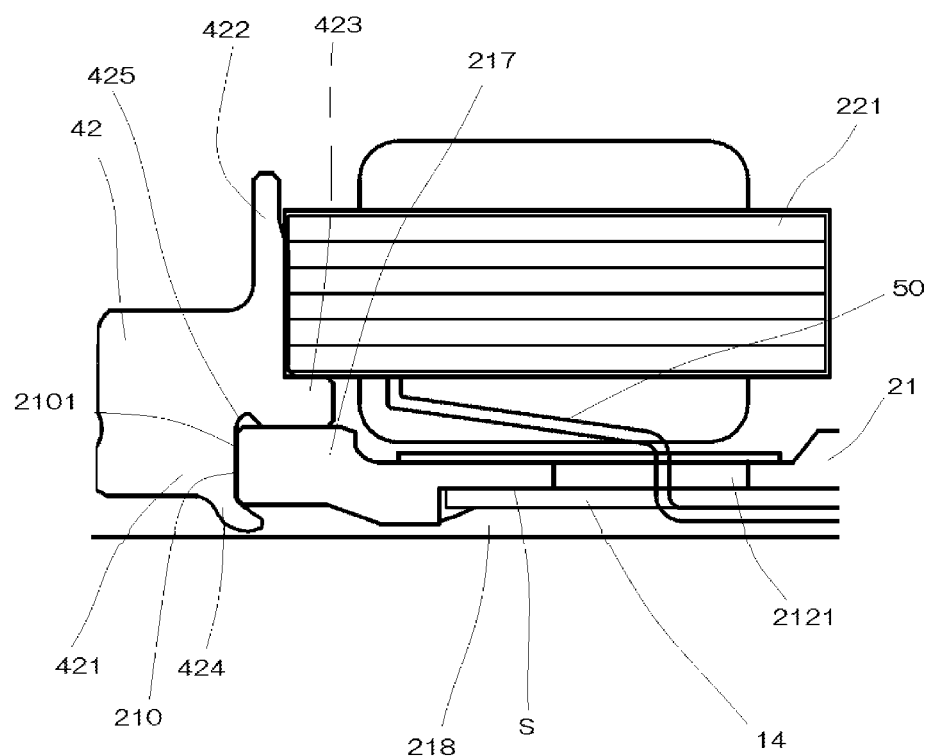
FIG. 11 is a partial section view of a motor according to a preferred modified example.

The second protrusion portion 424 need not necessarily make contact with the lower surface of the peripheral edge portion 217. FIG. 11 shows a yet still further modified example of the preferred embodiment. As shown in FIG. 11, the second protrusion portion 424 is inclined with respect to the center axis J1. The minimum angle between the second protrusion portion 424 and the direction perpendicular to the center axis J1 may be smaller than, e.g., 90 degrees. The tip end of the second protrusion portion 424 is opposed to the axial lower region of the peripheral edge portion 217 with a gap left therebetween. The tip end of the second protrusion portion 424 is arranged axially above the lower surface of the base member 21. In other words, the tip end of the second protrusion portion 424 does not protrude axially below the lower surface of the base member 21. This makes it possible to reduce the axial thickness of the motor 1.

As shown in FIG. 11, the axial lower end region of the inner surface 2101 makes contact with at least a portion of the second protrusion portion 424. More specifically, the radial inner region of the second protrusion portion 424 makes contact with the axial lower end region of the inner surface 2101. For that reason, even if a gap exists between the second protrusion portion 424 and the peripheral edge portion 217, the second protrusion portion 424 can fix the base member 21 by caulking. Thus, the bushing 42 is fixed with respect to the base member 21.

The structures of the preferred embodiment and the structures of the modified examples described above may be used in combination.

Only one second through-hole 2121 may be formed in the first recess portion 212. In this case, the lead wires 50 extending from the coils 222 are led out from the upper surface of the base member 21 to the lower surface thereof through the second through-hole 2121. As compared with a case where a plurality of second through-holes 2121 is arranged in the base member 21, the rigidity of the base member 21 is increased.

In case where a plurality of second through-holes 2121 is arranged in the first recess portion 212, there may exist a second through-hole 2121 through which the lead wires 50 are led out and a second through-hole 2121 through which the lead wires 50 are not led out. A plurality of lead wires 50 may be led out through a single second through-hole 2121.

In the aforementioned preferred embodiment, there is arranged only one protrusion portion 28. However, the number of the protrusion portion 28 is not limited to one. A plurality of protrusion portions 28 may be arranged within the first recess portion 212. In this case, a plurality of third recess portions 215 is arranged on the lower surface of the base member 21 in the positions corresponding to the positions of the protrusion portions 28. Each of the protrusion portions 28 may include an upper slant surface 281. There may be arranged a protrusion portion 28 having an upper slant surface 281 and a protrusion portion 28 not having an upper slant surface 281. The third recess portion 215 corresponding to the protrusion portion 28 having an upper slant surface 281 may include a lower slant surface 2151. The third recess portion 215 corresponding to the protrusion portion 28 not having an upper slant surface 281 may not include a lower slant surface 2151.

The upper slant surface 281 of the protrusion portion 28 may be a surface inclined 90 degrees with respect to the center axis J1. Likewise, the lower slant surface 2151 of the third recess portion 215 may be a surface inclined 90 degrees with respect to the center axis J1. In this case, the protrusion portion 28 and the third recess portion 215 have a step-like shape.

The coplanar surface S may not be wholly covered with the resin material. Only the region of the coplanar surface S in which the second through-hole 2121 is arranged may be covered with the resin material. Even in this case, the second through-hole 2121 is closed by the resin material. Therefore, some portions of the lead wires 50 are fixed within the second through-hole 2121. Dust or the like is prevented from infiltrating into the motor 1 through the second through-hole 2121.

The coplanar surface S may not be covered with the resin material but may be covered with a sealing material such as a sticky material or the like. Even in this case, the second through-hole 2121 is closed by the sealing material. Therefore, dust or the like is prevented from infiltrating into the motor 1 through the second through-hole 2121. It is however preferred that the sealing material be provided with a hole through which each of the lead wires 50 can pass. Preferably, the sealing material has an insulating property.

As described above, the motor 1 is a three-phase motor. However, the number of phases of the motor need not be particularly limited. For example, it may be possible to employ a single-phase motor or a multiple-phase motor such as a five-phase motor or a seven-phase motor. The number of the second through-holes 2121 arranged in the second recess portion 214 may be changed in conformity with the number of lead wires or the treatment method of a common wire.

The present invention can be used in a motor for a disk drive apparatus or in a motor for other applications than the disk drive apparatus.

Figure 12:
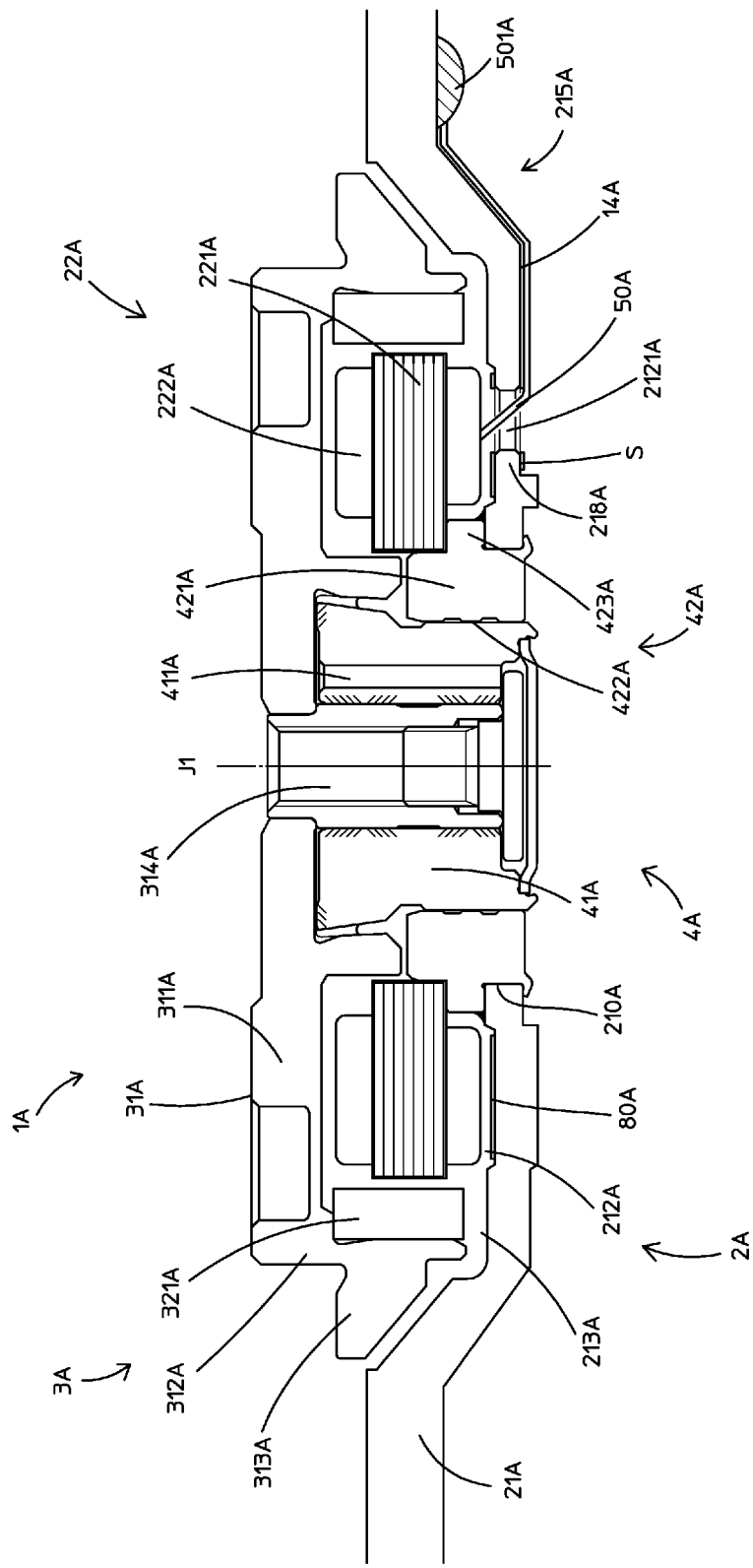
FIG. 12 is a schematic sectional view of a spindle motor according to a second preferred embodiment of the present invention.

FIG. 12 is a sectional view of a spindle motor 1A according to a second preferred embodiment of the present invention. Since the basic configuration of the spindle motor 1A according to the second preferred embodiment preferably is the same or substantially the same as the basic configuration of the first preferred embodiment, only the different portions will be described. The elements of the second preferred embodiment of the present invention having a same or similar function to elements already described above have a same reference number as the elements already described above, but include an "A" after the reference number. A stationary unit 2A preferably includes a base member 21A, a stator 22A, a wiring substrate 14A, and a holder 42A. The stator 22A preferably includes a stator core 221A and coils 222A.

The holder 42A preferably has a cylindrical or substantially cylindrical shape and preferably includes a through-hole defined at the center thereof. The holder 42A preferably includes a cylinder portion 421A. A sleeve 41A is provided inside the cylinder portion 421A. The inner surface of the cylinder portion 421A is radially opposed to the outer surface of the sleeve 41A through an adhesive agent. The sleeve 41A is preferably fixed to the holder 42A by the adhesive agent.

The stator 22A is fixed to the outer surface of the cylinder portion 421A. More specifically, the inner surface of the stator core 221A is fixed to the outer surface of the cylinder portion 421A by, for example, press-fitting, caulking, or the like. An adhesive agent may be used in fixing the stator core 221A. The stator core 221A is located axially above a thin portion 218A.

The holder 42A is preferably provided in a first through-hole 210A. The holder 42A preferably includes a first protrusion portion 423A. The first protrusion portion 423A extends radially outward. More specifically, the first protrusion portion 423A extends radially outward from the outer surface of the cylinder portion 421A. The stator core 221A is axially opposed to the first protrusion portion 423A and is located above the first protrusion portion 423A. The inner surface of the stator core 221A is located radially inward of the radial outer end portion of the first protrusion portion 423A. Preferably, at least a portion of the stator core 221A makes contact with the first protrusion portion 423A.

Figure 13:
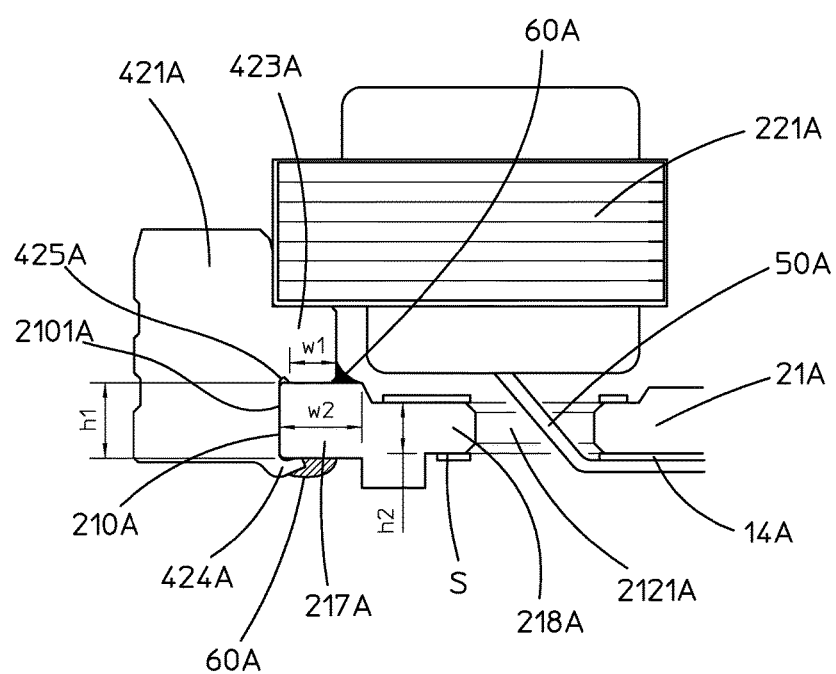
FIG. 13 is a sectional view of the motor according to the second preferred embodiment of the present invention.

FIG. 13 is an enlarged view of the holder 42A and its vicinity. The first protrusion portion 423A is located axially above the peripheral edge portion 217A and is axially opposed to the peripheral edge portion 217A. The first protrusion portion 423A and the peripheral edge portion 217A make contact with each other. The holder 42A preferably includes a second protrusion portion 424A. The second protrusion portion 424A extends radially outward. More specifically, the second protrusion portion 424A extends radially outward from the lower end portion of the cylinder portion 421A. The second protrusion portion 424A is located axially above at least a portion of the lower surface of the base member 21A. The second protrusion portion 424A is positioned axially below the lower end surface of the holder 42A. More specifically, the second protrusion portion 424A is positioned axially below the lower end surface of the cylinder portion 421A. The second protrusion portion 424A is located axially below the first protrusion portion 423A. The second protrusion portion 424A is located axially below the peripheral edge portion 217A. At least a portion of the second protrusion portion 424A is axially opposed to the peripheral edge portion 217A. Thus, the peripheral edge portion 217A is located between the first protrusion portion 423A and the second protrusion portion 424A. The second protrusion portion 424A and the peripheral edge portion 217A make contact with each other.

Caulking and an adhesive agent 60A, for example, may be used in fixing the holder 42A and the base member 21A. This configuration makes it possible to firmly fix the holder 42A to the base member 21A. Since the adhesive agent 60A is located between the holder 42A and the base member 21A, it is possible to prevent a gas from flowing through between the holder 42A and the base member 21A. Preferably, the adhesive agent 60A is arranged between the holder 42A and the base member 21A to extend annularly in the circumferential direction. More specifically, as shown in FIG. 13, the annular adhesive agent 60A is preferably arranged between the peripheral edge portion 217A and at least one of the first protrusion portion 423A and the second protrusion portion 424A. The annular adhesive agents 60A may be arranged between the peripheral edge portion 217A and both of the first protrusion portion 423A and the second protrusion portion 424A. According to the second preferred embodiment shown in FIG. 13, it is possible to obtain the same effects as those of the first preferred embodiment.

Figure 14:
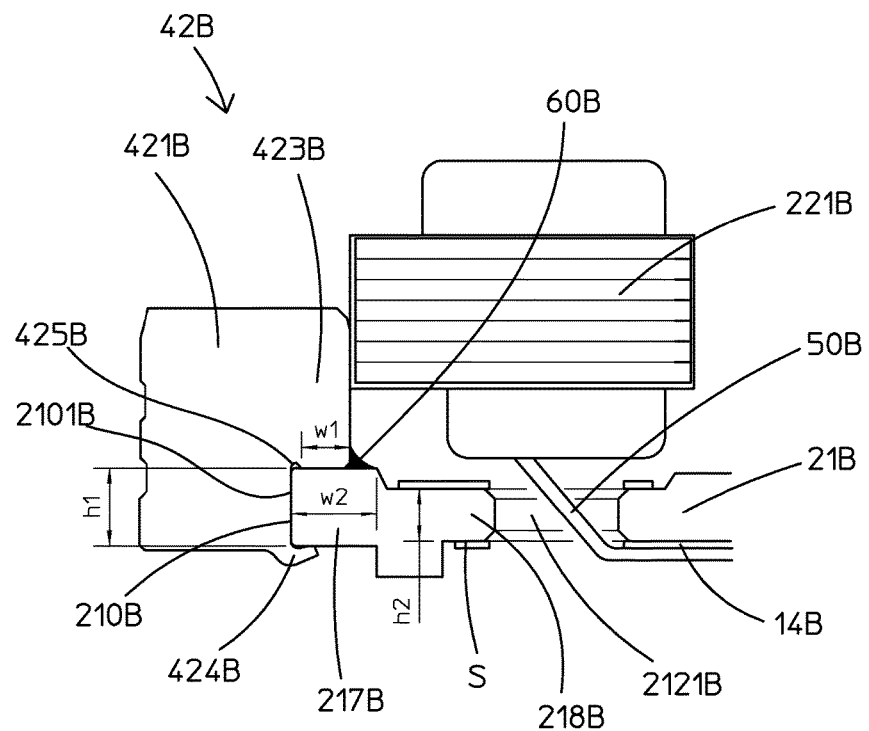
FIG. 14 is a sectional view of a motor according to a modified example of the second preferred embodiment of the present invention.

FIG. 14 shows a holder 42B according to a modified example of the second preferred embodiment. The elements of the modified example of the second preferred embodiment of the present invention having a same or similar function as elements already described above have a same reference number as the elements already described above, but include a "B" after the reference number. As shown in FIG. 14, the inner surface of the stator core 221B is preferably fixed to the outer surface of the first protrusion portion 423B by, for example, press-fitting, caulking, or the like. An adhesive agent may be used in fixing the stator core 221B. The stator core 221B is preferably arranged axially above the thin portion 218B. According to the modified example of the preferred embodiment shown in FIG. 14, it is possible to obtain the same effects as those of the second preferred embodiment.

While preferred embodiments of the present invention have been described using the shaft-rotating spindle motor as an example, the present invention is not limited thereto. The present invention may be also be applied to a shaft-fixed spindle motor, for example. That is to say, the bearing may be applied to either of the shaft-rotating configuration and the shaft-fixed configuration. The bearing may also be, for example, a fluid dynamic-pressure bearing, a gas dynamic-pressure bearing, or a ball bearing.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
    a bearing;
    a rotary unit connected to the bearing and configured to rotate about a center axis;
    a stator including a stator core and at least one coil wound around the stator core;
    a thin flat base member; and
    a cylindrical holder extending in an axial direction; wherein
    the base member includes a first through-hole extending in the axial direction, a peripheral edge portion extending radially outward from the first through-hole, and a thin portion located radially outward of the peripheral edge portion and having an axial thickness smaller than an axial thickness of all other portions of the base member the peripheral edge portion;
    the holder is located in the first through-hole;
    the holder includes a first protrusion portion extending radially outward and located axially above the peripheral edge portion and a second protrusion portion extending radially outward and located axially below the peripheral edge portion;
    the second protrusion portion is located axially above a portion of a lower surface of the base member;
    the second protrusion portion is located axially below a lower surface of the thin portion and axially below a lower end surface of the holder;
    the bearing is located inside the holder;
    the stator core is located outside the holder and axially above the thin portion such that a portion of the thin portion is located directly axially below the stator core; and
    the second protrusion portion extends in a radial direction, or is deformed in a radial direction, to cover or overlap a lower surface of the peripheral edge portion.

2. The motor of claim 1, wherein the thin portion extends in a circumferential direction about the center axis, and the thin portion is located radially outward of a radial outer end of the first protrusion portion and located radially outward of a radial outer end of the second protrusion portion.

3. The motor of claim 1, wherein a radial length of a region of the first protrusion portion axially opposed to the peripheral edge portion is smaller than a radial length of the peripheral edge portion.

4. The motor of claim 1, wherein the first protrusion portion extends in a circumferential direction along an outer surface of the holder.

5. The motor of claim 1, wherein the stator core is located axially above the first protrusion portion.

6. The motor of claim 5, wherein at least a portion of the coil is located radially outward of the first protrusion portion.

7. The motor of claim 5, wherein the first protrusion portion and the second protrusion portion make contact with the peripheral edge portion.

8. The motor of claim 1, wherein the first protrusion portion and the second protrusion portion make contact with the peripheral edge portion.

9. The motor of claim 1, wherein the stator core is fixed to an outer surface of the first protrusion portion.

10. The motor of claim 1, wherein the second protrusion portion extends radially outward along a lower surface of the peripheral edge portion, and a radial outer end portion of the second protrusion portion is located radially inward of a radial outer end portion of the first protrusion portion.

11. The motor of claim 1, wherein an annular adhesive agent is located between the peripheral edge portion and at least one of the first protrusion portion and the second protrusion portion.

12. A disk drive apparatus, comprising:
    the motor of claim 1;
    at least one disk held at the rotary unit; and
    a housing configured to accommodate the motor and the disk therein.

* * * * *